United States Patent [19]
Majid et al.

[11] Patent Number: 6,018,467
[45] Date of Patent: Jan. 25, 2000

[54] RESONANT MODE POWER SUPPLY HAVING AN EFFICIENT LOW POWER STAND-BY MODE

[75] Inventors: Naveed Majid, Mohegan Lake, N.Y.; Jerzy Janczak, Eindhoven, Netherlands; Patrick E. G. Smeets, Geldrop, Netherlands

[73] Assignee: Philips Electronics North America Corporation, New York, N.Y.

[21] Appl. No.: 09/362,465

[22] Filed: Jul. 28, 1999

[51] Int. Cl.[7] ........................... H02M 3/337; H02H 7/122
[52] U.S. Cl. .................... 363/16; 363/25; 363/49; 363/56
[58] Field of Search ................... 363/16, 17, 24, 363/25, 49, 50, 55, 56, 97, 98, 132, 133, 134

[56] References Cited

U.S. PATENT DOCUMENTS

| | | | |
|---|---|---|---|
| 4,692,851 | 9/1987 | Attwood | 363/16 |
| 5,291,383 | 3/1994 | Oughton | 363/17 |
| 5,703,764 | 12/1997 | Hermann et al. | 363/21 |

FOREIGN PATENT DOCUMENTS 2169424A 7/1986 United Kingdom .

*Primary Examiner*—Y. J. Han
*Attorney, Agent, or Firm*—Edward W. Goodman

[57] ABSTRACT

A resonant mode power supply includes a D.C. voltage source and switching elements for alternatively connecting an oscillating circuit, including a primary winding of a transformer, to the D.C. voltage source and to ground. A first secondary winding supplies the main output voltage of the power supply and a second secondary winding provides a control output voltage. An opto-coupler is included and has a light emitter connected to the second secondary winding, and a light sensor connected to a controller for controlling the switching of the switching elements, wherein the higher the frequency of the switching, the lower the power being supplied by the power supply. Burst mode stand-by is started by the first secondary winding being shunted to the second secondary winding causing the light emitter to emit a maximum amount of light. The controller increases the switching frequency until it exceeds a predetermined maximum frequency. The controller then stops the switching of the switching elements until the voltage across the light emitter falls below a predetermined value, and the controller then re-starts the switching.

6 Claims, 5 Drawing Sheets

RESONANT MODE POWER SUPPLY HAVING AN EFFICIENT LOW POWER STAND-BY MODE

BACKGROUND OF THE INVENTION

1. Field of the Invention

The subject invention relates to resonant mode power supplies, e.g., for television receivers.

2. Description of the Related Art

Television receivers include power supplies for supplying power to the various circuit components. Generally, these power supplies are in the form of switched-mode power supplies in which a dc voltage is applied to one end of the primary winding of a flyback transformer. The other end of the primary winding is connected to ground through a switching element which is controlled to switch on and off at a predetermined frequency. The switched power to the transformer is then transferred to the secondary winding for providing output power.

It has been found that resonant mode power supplies have higher efficiencies and are especially suited for power levels higher than 150 W and for power supplies that need to be miniaturized, e.g., power supplies for battery charging. In a resonant mode power supply, an oscillating circuit, which is typically a series oscillating circuit, is supplied through a first switching element with a direct voltage by which the oscillating circuit is excited charging a capacitor in the oscillating circuit. After one-half of an oscillating period, the first switching element is opened, and the oscillating circuit is connected to ground through a second switching element, and as a result, the capacitor of the oscillating circuit discharges, and the oscillation is thus continued. An oscillation can accordingly be excited by alternating opening and closing the two switching elements.

Present day television receivers are controlled by microprocessors. If power is completely removed from the television receiver when it is turned off, all of the parameters stored in the microprocessor, e.g., last volume level, last channel being watched, favorite channels, etc., are lost. In order to prevent this loss of information, the power supply includes a stand-by mode in which power is removed from the main operating circuits of the television receiver, but the microprocessor still receives sufficient power to retain the stored information, as well as to allow the microprocessor to reactivate the television receiver through the use of, for example, a remote control.

While, in a standard stand-by mode, a reduced amount of power is consumed, new specifications for television receivers require that the amount of power consumed during stand-by operation be lower than 5 watts. This is achieved in switched-mode power supplies by operating the power supply in a burst mode of operation, wherein the power supply operates at its normal frequency for limited periods of time (bursts) which are at a low frequency (e.g., 5–10 Hz).

SUMMARY OF THE INVENTION

It is an object of the present invention to provide a stand-by mode for a resonant mode power supply in which a very low amount of power is consumed by the power supply.

A further object of the present invention is to provide the stand-by mode by instituting a burst mode of operation for the resonant mode power supply.

These objects are achieved in a resonant mode power supply comprising means for generating a D.C. supply voltage having a first terminal and a second terminal; a first switching element having a first terminal coupled to said first terminal of said generating means, and a second terminal connected to a supply node; a second switching element having a first terminal coupled to said supply node and a second terminal coupled to said second terminal of said generating means; a transformer comprising a primary winding having a first end, and a second end connected to the second terminal of said second switching element, an auxiliary winding for providing an auxiliary voltage indicative of a main output voltage, a first secondary winding for providing said main output voltage, and a second secondary winding for providing a control output voltage; a capacitor for coupling the first end of the primary winding to the supply node; means for regulating the control output voltage, said regulating means comprising light emitting means coupled to said second secondary winding for receiving said control output voltage, and light detecting means optically coupled to said light emitting means, said light emitting means emitting a variable light output depending on a value of said control output voltage; and a controller connected to control inputs of said first and second switching elements for alternatively turning on and off said first and second switching elements for inducing an oscillation in an oscillating circuit including at least said capacitor and said primary winding of said transformer, wherein a frequency of said turning on and off of said first and second switching elements is inversely proportional to an amount of power being delivered by said resonant mode power supply, said controller having a control voltage input coupled to an output of said light detecting means for receiving a variable control voltage corresponding to the variable light output of said light detecting means, said controller varying said frequency in dependence on said variable control voltage, characterized in that said resonant power supply further comprises means for instituting a burst mode stand-by mode comprising:

means for coupling said first secondary winding to said second secondary winding thereby causing said control voltage generating means to generate a maximum control voltage and said controller to increase said frequency to compensate for said maximum control voltage;

means for determining when said frequency exceeds a predetermined maximum frequency, and for stopping the switching of said first and second switching elements thereby removing power from said first and second secondary windings resulting in said control voltage generating means to generate a lower control voltage;

means for determining when said control voltage drops below a predetermined minimum value; and means for restarting the switching on and off of said first and second switching elements when said control voltage drops below said predetermined minimum value, whereby power is re-applied to the first and second secondary windings and the control voltage generating means again generates the maximum control voltage thereby repeating burst cycles until said coupling means uncouples the first secondary winding from the second secondary winding.

By shunting the main output power of the first secondary winding to the second secondary winding, the light sensing means generates a maximum amount of light and the light detecting means applies a maximum control signal to the controller. In response thereto, the controller increases the switching frequency of the switching devices in order to reduce the output power. When the switching frequency exceeds a predetermined maximum value, the controller stops the switching of the switching devices until the control voltage drops below a predetermined threshold value, indicating that the control output voltage has correspondingly dropped below a threshold value. The controller then re-starts the switching of the switching devices until, again, the control output voltage exceed the predetermined maximum.

BRIEF DESCRIPTION OF THE DRAWINGS

With the above and additional objects and advantages in mind as will hereinafter appear, the invention will be described with reference to the accompanying drawings, in which.

DESCRIPTION OF THE PREFERRED EMBODIMENTS

Figure 1:
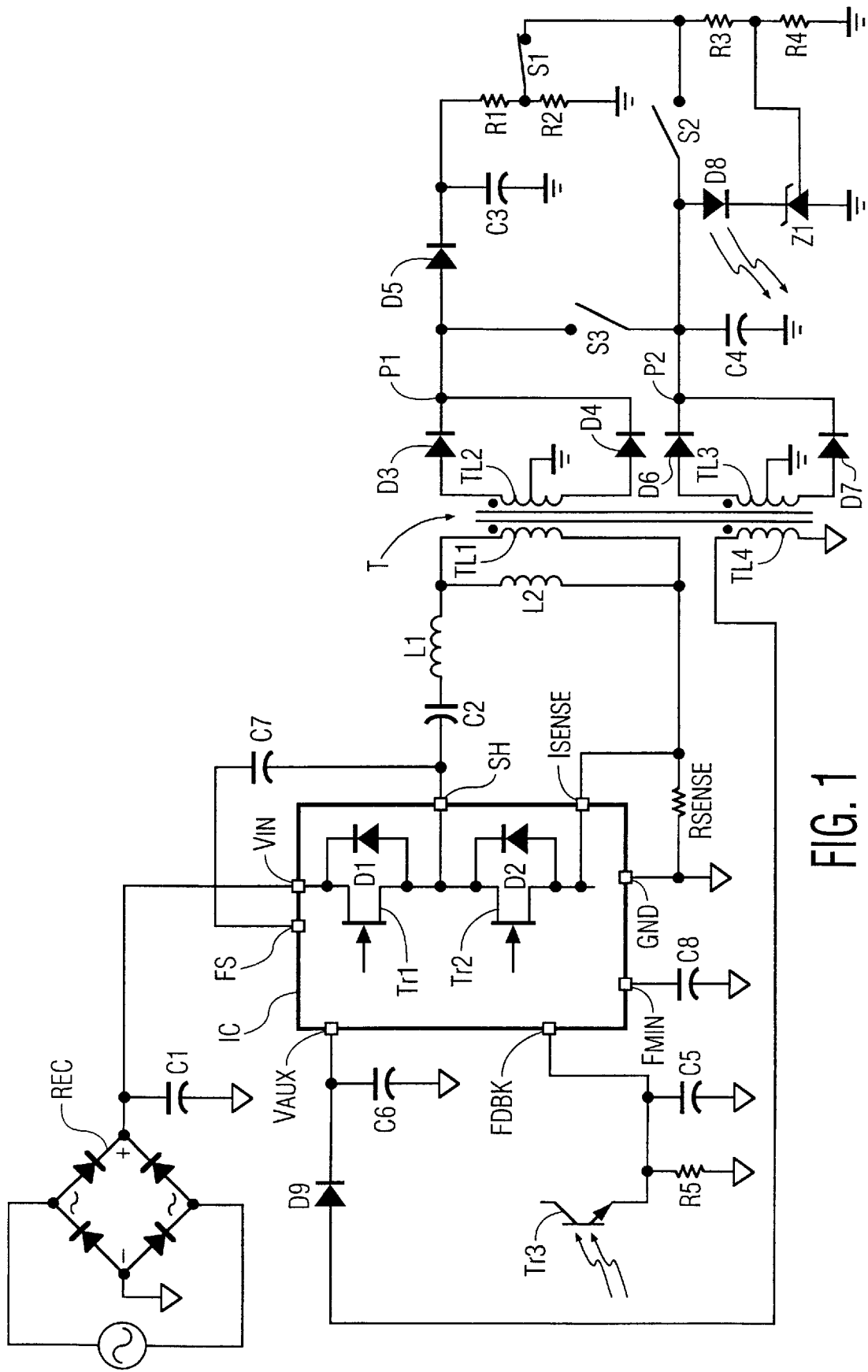
FIG. 1 shows a block schematic diagram of a resonant mode power supply.

FIG. 1 shows a block schematic diagram of a resonant mode power supply. Line voltage is applied to a diode rectifier bridge REC forming a D.C. voltage supply. This D.C. voltage is connected to ground via a capacitor C1 and is also connected to ground via a series arrangement of two switching devices Tr1 and Tr2 shunted by diodes D1 and D2, respectively, through a $V_{IN}$ input and ground GND terminal of a controller IC. The junction between the two switching devices Tr1 and Tr2 is connected to a SH output of the controller IC which is connected to ground via a series arrangement of a capacitor C2, a first inductor L1, a second inductor L2 and a resistor $R_{SENSE}$. A primary winding TL1 of a transformer T is connected across the second inductor L2. A first secondary winding TL2 of the transformer T has a center tap connected to ground, and a first and second diode D3 and D4 having their anodes connected to the ends of the first secondary winding TL2 and their cathodes interconnected at a junction point P1. An output diode D5 has its anode connected to the junction point P1 and its cathode connected to ground via an output capacitor C3 and via a series arrangement of two resistors R1 and R2. The output voltage of the resonant mode power supply is taken across the output capacitor C3.

For controlling the power supply, the transformer T has a second secondary winding TL3 of the transformer T which has a center tap connected to ground, and a third and a fourth diode D6 and D7 having their anodes connected to the ends of the second secondary winding TL3 and their cathodes interconnected at a junction point P2. A first switch S1 connects the junction between the resistors R1 and R2 to ground via a series arrangement of two resistors R3 and R4. A second switch S2 connects the resistors R3 and R4 to the junction point P2. A third switch S3 connects the junction point P1 to the junction point P2, which is connected to ground via a microprocessor capacitor C4 which provides operating power for a microprocessor (not shown). The switches S1, S2 and S3 are controlled by microprocessor to be in the positions shown for a normal operating mode. In addition, the junction point P2 is connected to ground via a series arrangement of a light emitter D6 of an opto-coupler and a zener diode Z1 having a control line connected to the junction point between the resistors R3 and R4.

The opto-coupler is used for controlling the regulation voltage of the power supply and further includes a sensor Tr3 for sensing the light output from the light emitter D8. An output from the sensor Tr3 is connected to a feedback (FDBK) input of the controller IC, which is also connected to ground via a resistor R5 and a capacitor C5.

The transformer T further includes an auxiliary winding TL4 for supplying an auxiliary voltage $V_{AUX}$ to the controller IC $V_{AUX}$ input via a diode D9. The $V_{AUX}$ input is also connected to ground by a capacitor C6. The controller IC derives operating power from the auxiliary voltage $V_{AUX}$. A capacitor C7 further connects the SH output to a floating source (FS) input of the controller IC.

Finally, a capacitor C8 couples a $F_{MIN}$ input of the controller IC to ground.

Figure 2:
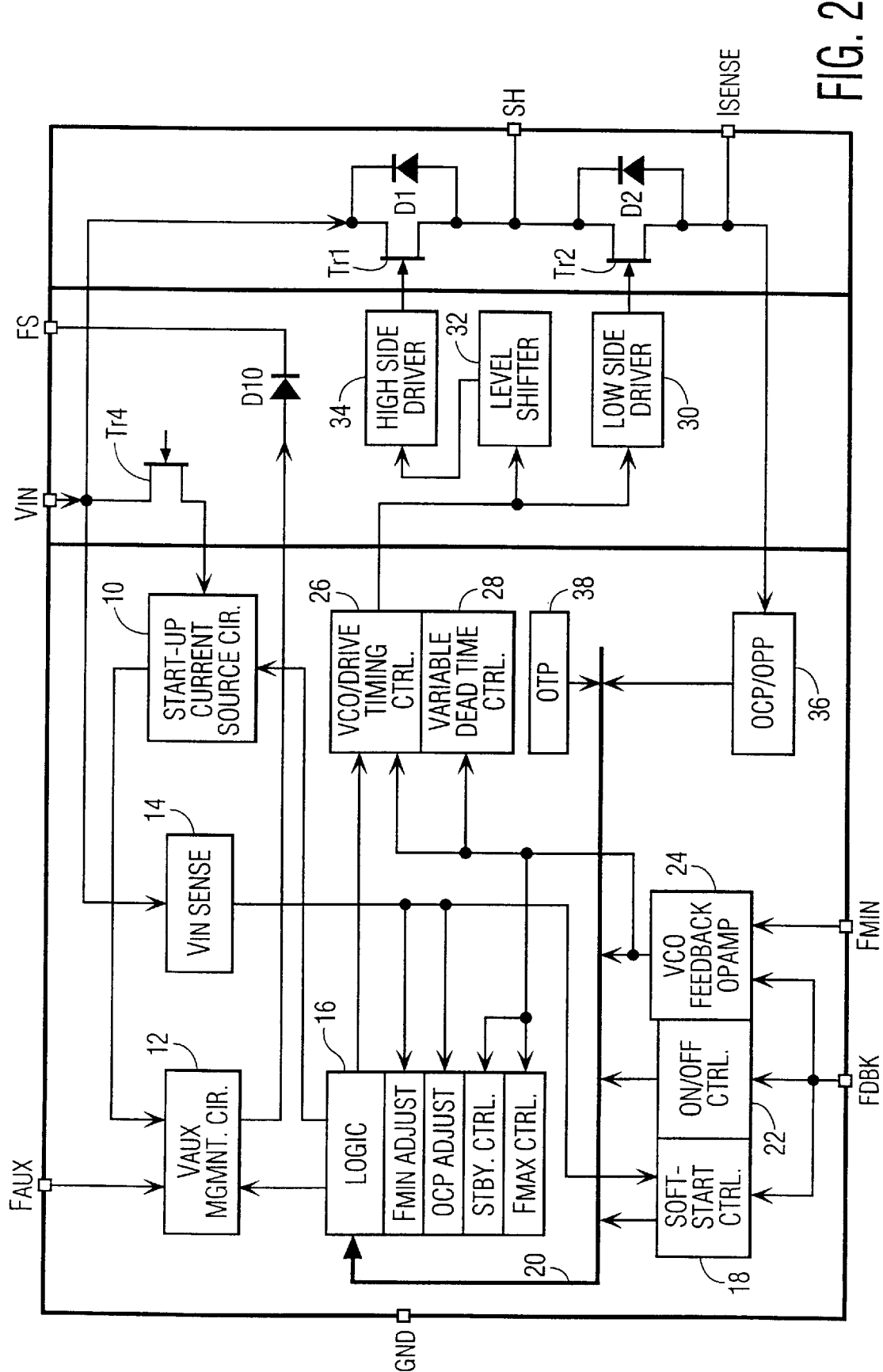
FIG. 2 shows a block diagram of the controller IC.

FIG. 2 shows a block diagram of the controller IC. The $V_{IN}$ input, in addition to being connected to the switching device Tr1, is connected, through a switching transistor Tr4, to a startup current source circuit 10 which applies a control signal to a $V_{AUX}$ management circuit 12 which is connected to the $V_{AUX}$ input of the controller IC. An over-voltage protection input of the $V_{AUX}$ management circuit 12 is connected to the FS input via a diode D10. A $V_{IN}$ sensing circuit 14 is also connected to the $V_{IN}$ input and applies a control signal to a $F_{MIN}$ adjust input and an OCP input of a logic circuit 16 and also to a control input of a soft-start controller 18. The $V_{AUX}$ management circuit 12 and the start-up current source circuit 10 receive control signals from the logic circuit 16. A soft-start controller 18 is connected to the FDBK input and applies a control signal to the logic circuit 16 via input bus 20. An ON/OFF controller 22 is also connected to the FDBK input and applies a control signal to the logic circuit 16 via the input bus 20. In addition, a VCO feedback op-amp 24 is connected to the FDBK input and to the $F_{MIN}$ input (to which capacitor C8 is connected for setting the minimum frequency) and applies another control signal to the logic circuit 16 via the input bus 20, as well as to a stand-by control input and a $F_{MAX}$ input of the logic circuit 16. An output from the logic circuit 16 is connected to a VCO/drive timing controller 26 which also receives the output from the VCO feedback op-amp 24. The drive timing controller 26 has a variable dead-time controller 28 connected to it which also receives the output from the VCO feedback op-amp 24. An output from the VCO/drive timing controller 26 is connected to a low side driver 30 which controls the switching device Tr2. The output from the drive timing controller 26 is further applied to a level shifter 32 which applies its output signal to a high side driver 34 for controlling the switching device Tr1. An over-current/ overpower protection circuit 36 is connected to the low side of the switching device Tr2 which is also connected to the $I_{SENSE}$ input of the controller IC. The over-current/over-power protection circuit 36 applies control signals to the logic circuit 16 via the input bus 20. In addition, an over-temperature protection circuit 38 is included and applies a control signal to the logic circuit via the input bus 20.

In operation, under control of the logic circuit 16, the VCO/drive timing controller 26 applies signals to the low-side driver 30 for driving the switching device Tr2, and to the high-side driver 34 through the level shifter 32 for driving the switching device Tr1. The switching devices Tr1 and Tr2 are alternately closed and opened every half oscillation period of the oscillating circuit formed by the capacitor C2, the inductors L1 and L2, and the primary winding TL1, thereby inducing a voltage in the secondary windings TL2 and TL3. The voltage across the primary winding TL1 appears in the auxiliary winding TL4 for controlling the power supply. Depending on the voltage at the FDBK input of the controller IC, the logic circuit 16 regulates the switching frequency of the switching devices Tr1 and Tr2 through the VCO/drive timing controller 26, wherein the higher the switching frequency, the lower the output power.

In order to institute stand-by mode, the microprocessor (not shown) opens switch S1 and closes switches S2 and S3 thereby removing the main output power from the output capacitor C3 and applying this power to the microprocessor capacitor C4. This additional power on the microprocessor capacitor C4 causes the voltage control output voltage to exceed a predetermined level, and in response thereto, the light emitting diode D8 emits a maximum amount of light. This is detected by the light sensor Tr3 which, in response, applies a maximum control voltage to the controller IC.

Figure 3:
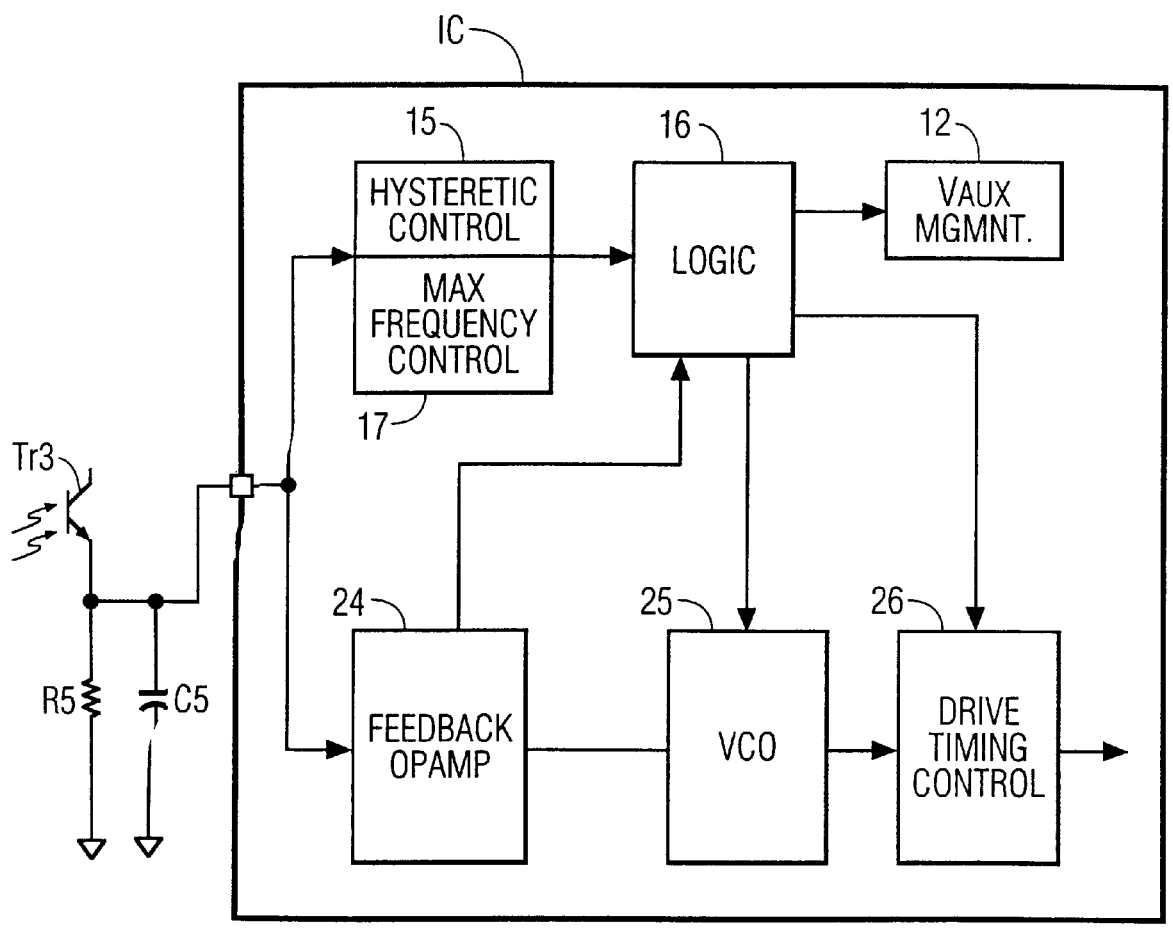
FIG. 3 shows a block diagram of a portion of the controller IC of FIG. 2.

FIG. 3 shows a block diagram of a portion of the controller IC in greater detail. The control voltage from the light sensor Tr3 is applied to a hysteretic control circuit 15 and to a maximum frequency control circuit 17 each of which applies a control signal to the logic circuit 16. The control voltage is also applied to the feedback opamp 24 which applies a control signal to a voltage-controlled oscillator (VCO) 25 which is also controlled by the logic circuit 16. An output from the VCO 25 is applied to the drive timing control 26 for controlling the frequency of switching of the switching devices Tr1 and Tr2.

In response to the maximum control voltage from the light sensor Tr3, the logic circuit 16 and the feedback opamp 24 push the frequency of the switching of the switching devices Tr1 and Tr2 to very high frequencies in an attempt to reduce the output voltage as evidenced by the maximum control voltage from the light sensor Tr3.

Figure 4:
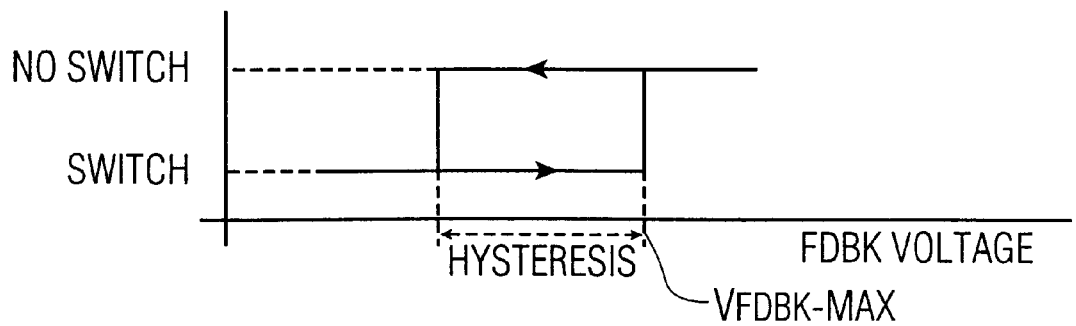
FIG. 4 is a graph showing the hysteretic control based on the feedback voltage.

By placing a maximum limit on the frequency of operation, the maximum frequency control circuit 17 applies a control signal to the logic circuit 16 when this limit is exceeded and the logic circuit 16 thereupon suspends the switching of the switching devices Tr1 and Tr2 by controlling the drive timing control circuit 26. The hysteretic control circuit 15 senses the control voltage on the FDBK input and prevents the logic circuit 16 from restarting the switching until the control voltage drops below a predetermined value (see FIG. 4).

The logic circuit 16 also controls the charging of capacitor C6 by the start-up current source circuit 10 through the $V_{AUX}$ management circuit 12. Between burst cycles, the start-up current source is turned on to charge capacitor C6 to a maximum value $V_{AUX-MAX}$. Once $V_{AUX-MAX}$ is reached, the charging of capacitor C6 is stopped and it will be gradually discharged by the controller IC current. This discharging will continue until the next burst cycle starts. During burst cycles, the start-up current source is turned off and the controller IC is supplied by the charge stored in capacitor C6, which discharges capacitor C6 at a higher rate. The dimensioning of capacitor C6 and of $V_{AUX-MAX}$ are chosen to ensure that during burst cycles, the $V_{AUX}$ voltage does not fall below a predetermined under voltage low threshold.

Figure 5:
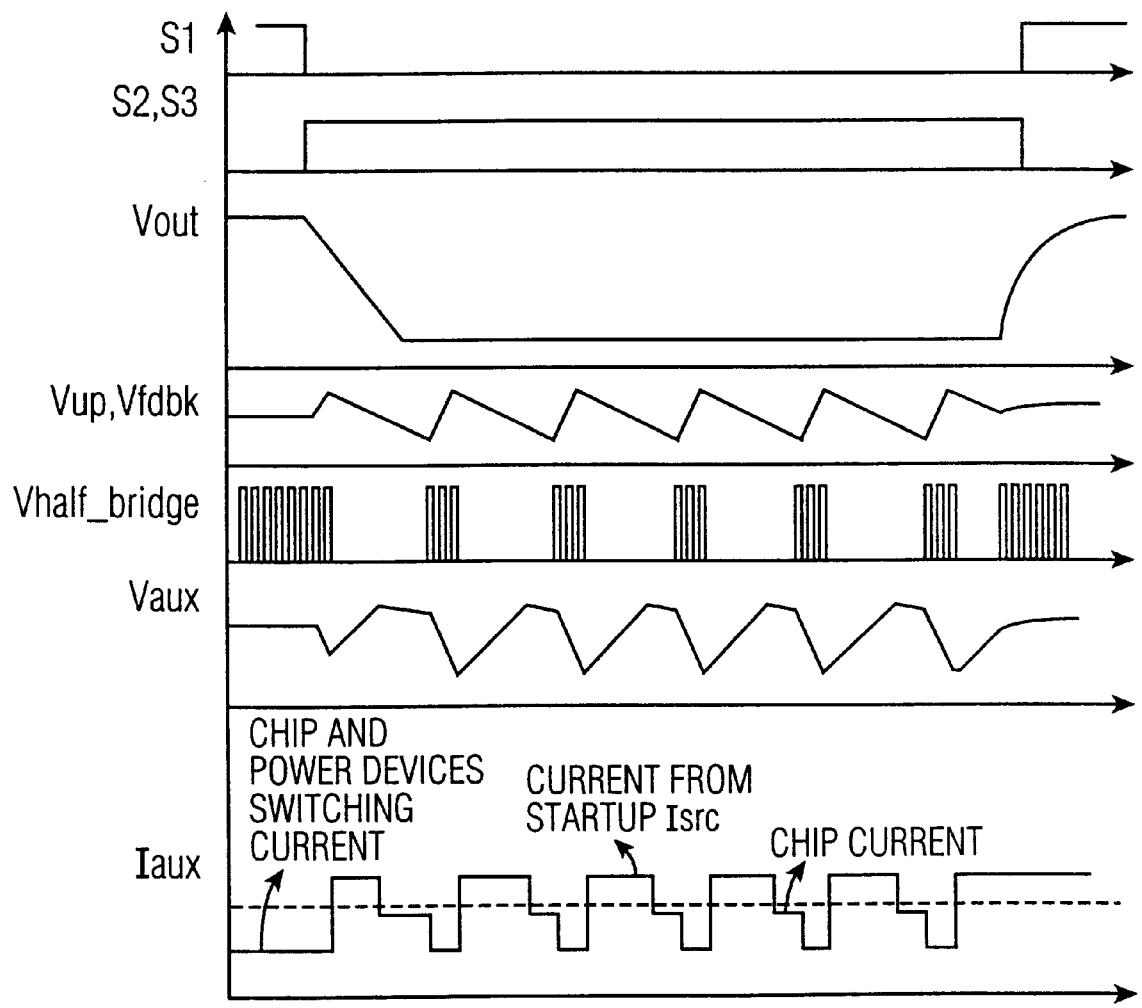
FIG. 5 is a graph showing various voltages and currents during burst mode operation.

FIG. 5 is a graph of the switching signals for the switches S1, S2 and S3, the main output voltage on capacitor C3, the voltage $V_{FDBK}$ on the FDBK input and the voltage $V_{up}$ across capacitor C4, the switching signal applied to one of the switching devices Tr1, Tr2, the auxiliary voltage $V_{AUX}$, and the current $I_{AUX}$ at the $V_{AUX}$ input of the controller IC.

Figure 6:
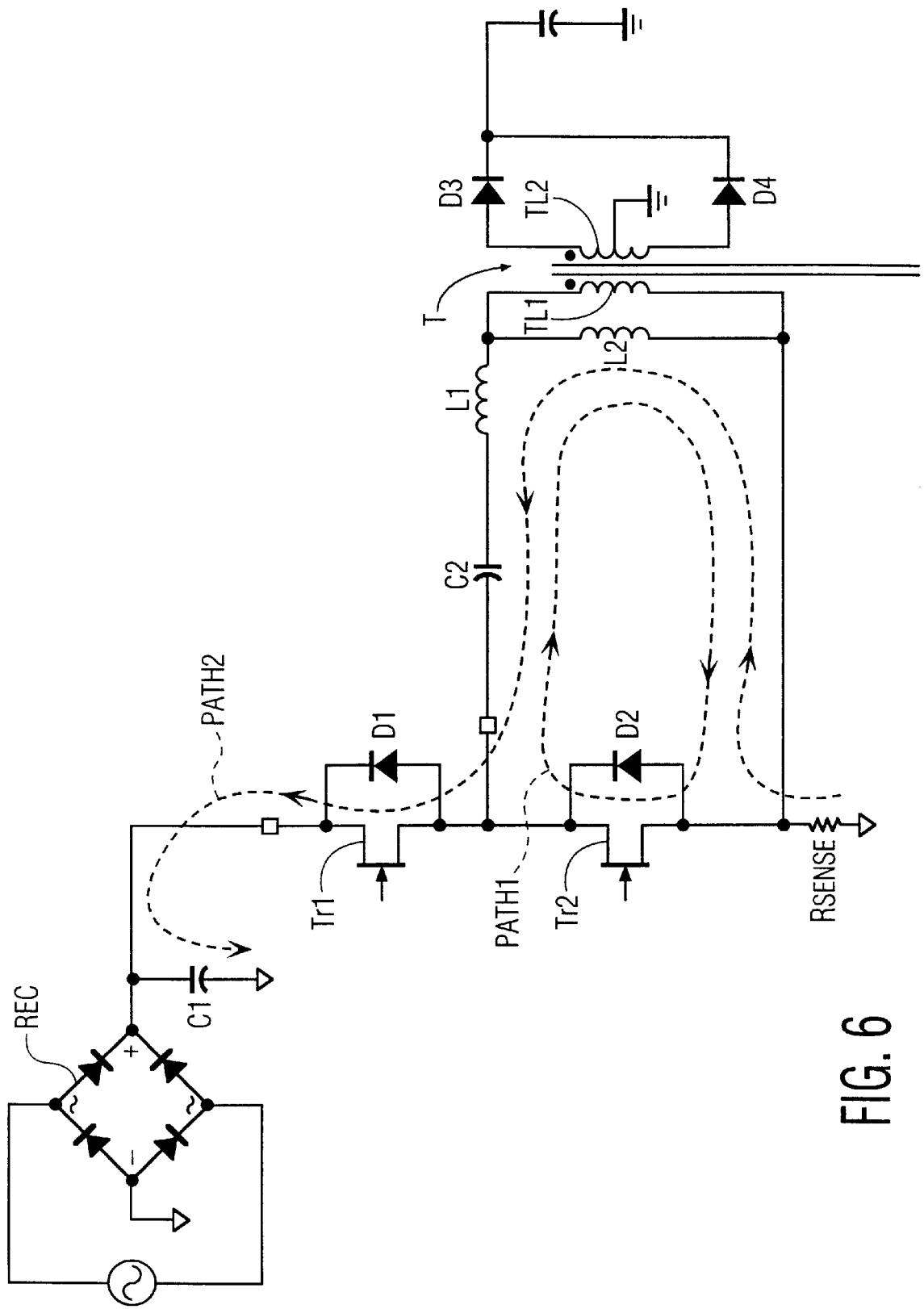
FIG. 6 shows a simplified schematic diagram of the resonant mode power supply of FIG. 1 showing the current paths.

Care must be taken to ensure that the burst cycle is always started with the resonant power supply in the correct state. To illustrate, consider the following case: a burst cycle has just finished and there is still energy circulating in the system. Although the half-bridge switches have been turned off, this energy is oscillating in the circuit between the drain-source capacitances of the half-bridge devices and the resonant inductance in the circuit. FIG. 6 shows the paths taken by the circulating energy.

The problem arises if the new burst cycle is started while the current in the circuit is following Path 1. To start the burst cycle, the high side device, switching device Tr1, in the half bridge has to be turned on. With the current in Path 1 and the switching device Tr1 turned on, a large reverse recovery current from the low side diode D2 will go through the switching device Tr1. This current can be large enough to damage the switching device Tr1. In order to get around this problem, the switching device Tr1 may only be turned on when the current is flowing in Path 2. In such a case, the current will smoothly commutate to the switching device Tr1 with no reverse recovery problems.

To determine in which path the current is flowing, the logic circuit 16 detects the current flowing through the $R_{SENSE}$ resistor at the $I_{SENSE}$ input, and controls the start of each burst cycle accordingly.

Numerous alterations and modifications of the structure herein disclosed will present themselves to those skilled in the art. However, it is to be understood that the above described embodiment is for purposes of illustration only and not to be construed as a limitation of the invention. All such modifications which do not depart from the spirit of the invention are intended to be included within the scope of the appended claims.

What is claimed is:

1. A resonant mode power supply comprising:

means for generating a D.C. supply voltage having a first terminal and a second terminal;

a first switching element having a first terminal coupled to said first terminal of said generating means, and a second terminal connected to a supply node;

a second switching element having a first terminal coupled to said supply node and a second terminal coupled to said second terminal of said generating means;

a transformer comprising a primary winding having a first end, and a second end connected to the second terminal of said second switching element, an auxiliary winding for providing an auxiliary voltage indicative of a main output voltage, a first secondary winding for providing said main output voltage, and a second secondary winding for providing a control output voltage;

a capacitor for coupling the first end of the primary winding to the supply node;

means for regulating the control output voltage, said regulating means comprising means coupled to said second secondary winding for generating a control voltage proportionate to said control output voltage; and a controller connected to control inputs of said first and second switching elements for alternatively turning on and off said first and second switching elements for inducing an oscillation in an oscillating circuit including at least said capacitor and said primary winding of said transformer, wherein a frequency of said turning on and off of said first and second switching elements is inversely proportional to an amount of power being delivered by said resonant mode power supply, said controller having a control voltage input coupled to said control voltage generating means for receiving a variable control voltage corresponding to the control output voltage, said controller varying said frequency in dependence on said variable control voltage, characterized in that said resonant power supply further comprises means for instituting a burst mode stand-by mode comprising:

means for coupling said first secondary winding to said second secondary winding thereby causing said control voltage generating means to generate a maximum control voltage and said controller to increase said frequency to compensate for said maximum control voltage;

means for determining when said frequency exceeds a predetermined maximum frequency, and for stopping the switching of said first and second switching elements thereby removing power from said first and second secondary windings resulting in said control voltage generating means to generate a lower control voltage;

means for determining when said control voltage drops below a predetermined minimum value; and means for restarting the switching on and off of said first and second switching elements when said control voltage drops below said predetermined minimum value, whereby power is re-applied to the first and second secondary windings and the control voltage generating means again generates the maximum control voltage thereby repeating burst cycles until said coupling means uncouples the first secondary winding from the second secondary winding.

2. The resonant mode power supply as claimed in claim 1, characterized in that said resonant mode power supply is an LLC resonant mode power supply and includes a first inductor connected between said capacitor and the first end of said primary winding, and a second inductor connected in parallel with said primary winding.

3. The resonant mode power supply as claimed in claim 1, characterized in that said control voltage generating means comprises an opto-coupler having light emitting means coupled to said second secondary winding for generating a light output in response to said output control voltage, and light sensing means optically coupled to said light emitting means for generating said control voltage in response to said light output.

4. The resonant mode power supply as claimed in claim 1, wherein said resonant mode power supply further comprises a control capacitor coupled to said second secondary winding, said control output voltage appearing across said control capacitor.

5. The resonant mode power supply as claimed in claim 1, wherein said resonant mode power supply further comprises first and second diodes coupled across said first and second switching elements, respectively, said first and second diodes conducting reverse currents when the respective first and second switching elements are open, thereby enabling a resonant operating mode of said resonant mode power supply.

6. The resonant mode power supply as claimed in claim 5, wherein said resonant mode power supply further comprises means for preventing said switching of said first and second switching elements from starting when current is flowing in said second diode, thereby preventing a large reverse recovery current flowing through said second diode from flowing through said first switching element.

\* \* \* \* \*